UNITED STATES PATENT OFFICE.

WESLEY W. HAMILTON, OF BROOKLYN, NEW YORK, ASSIGNOR TO DANIEL D. DENTON, TRUSTEE, OF SAME PLACE.

TREATMENT OF ANIMAL AND VEGETABLE FIBER FOR UPHOLSTERING.

SPECIFICATION forming part of Letters Patent No. 332,515, dated December 15, 1885.

Application filed June 6, 1885. Serial No. 167,890. (No specimens.)

*To all whom it may concern:*

Be it known that I, WESLEY W. HAMILTON, of Brooklyn, in the county of Kings and State of New York, have invented a certain new and useful Improvement in the Treatment of Animal and Vegetable Fibers for Upholstering Uses, of which the following is a full, clear, and exact description.

My invention relates to the treatment of animal and vegetable fibers whereby they are made more suitable for upholstering uses.

I have discovered and by a series of experiments have demonstrated that certain animal fibers—to wit, hog or pig hair and the hair from the tails of horses and cattle and manes of horses—and certain vegetable fibers—to wit, istle or tampico and cocoanut fiber—can, by a certain mechanical and boiling treatment, have imparted to them improved upholstering properties—that is to say, that by said mechanical operation they are curled, bent, or twisted, and by said boiling operation said curls, bends, or twists are partially relaxed, and then confirmed or made more permanent in their relaxed condition; and this I accomplish by subjecting to the process hereinafter described the raw material mentioned—to wit, horse-hair, hog-hair, istle, and cocoanut fiber—which, in their normal or commercial condition, do not possess these improved properties.

Curl is an essential to a good upholstering fiber. The character of the curl is also to be considered. A "ringlet" is too regular in its form, and does not retain its upholding-power when in ordinary use. Softness, slipperiness, and strength of spring are also desirable features.

I do not use the term "curl" in its strictest sense; but I mean thereby a waved, bent, or twisted form.

Curl, resiliency, and strength and durability of spring constitute some of the leading characteristics of good upholstering fibers. Such characteristics are found in a greater or less degree in what is known in the market as "curled hair" after it is curled and as "horsehair" before it is curled, and which is the hair from the tails and manes of horses and the tails of cattle. This horse-hair is curled by what is known as the "roping process." This roping process is mainly applicable to long fibers, though short fibers are sometimes curled by that process in connection with long fibers. I am not aware, however, that short fibers—for example, short, straight, rigid hog-hair—can be successfully curled alone by this roping process so as to yield good upholstering results. This roping process is also applied to certain vegetable fibers—as, for example, cocoanut fiber; but it yields very poor upholstering results, except when applied to long horse-hair or mixtures of long and short fibers.

Certain animal hair is also curled by chemical process—cow-hair, for example; but the corrosive action of the chemicals employed injures the strength of the hair and imparts to it feltive properties, which are hurtful to upholding-power.

Another process publicly employed to impart curl to vegetable fibers to improve their upholstering value is winding the fibers around a small heated spindle. This spindle process is chiefly confined to cocoanut fiber. It is a very slow and a very expensive process.

There is also in operation a "crimping process," which is substantially limited in its employment to cocoanut fiber. The curl imparted to the fibers by this crimping process is simply crimped impressions. It is a cheap and a quick process, but it yields an unsatisfactory upholstering product.

By my process I impart an irregular curl to either long or short animal or vegetable fibers—for example, to hog or pig hair, to the hair taken from the tails and manes of horses and the tails of cattle, to the vegetable fibers called "istle" or "tampico" and cocoanut fiber.

My process is quick, simple, inexpensive, and can at all times be kept within the safe control of the operator, who can at will vary the degree of curl to be imparted to the fiber under treatment, according to its length, nature, quality, and strength.

In carrying my invention into practical effect I take, for example, horse-hair about nine inches long and of good elastic quality, and intermingle the fibers so that they will lie more or less across and not parallel with each other. I then take the fibers, while so intermingled, in double handfuls at a time, and squeeze them tightly into a close bunch, and place the squeezed bunch in a strong vessel of cylindrical form in its interior, then take other double handfuls of the fibers and squeeze and bunch and place them in the cylinder, and pack them down tightly therein by rammer or by hand, and this I repeat until all the fibers that are to be treated in one operation are in the cylinder, and the cylinder is nearly full of fibers. This operation I will call the "preliminary packing."

The cylindrical vessel is made in two longitudinal sections, is firmly bound together by metal clamps and rings, is closed at the bottom by a removable plate fastened to it by hooks and lags, is smooth inside, and has vents distributed in and about the bottom plate for the escape of air, and its height is four times as great as its internal diameter. Upon this charge of fibers I superimpose a thick metal plate fitting snugly to the interior of the cylinder, but free enough to move therein without binding. Upon this plate I apply strong pressure through a piston or follower, so as to compress the intermingled fibers between the top and bottom plates and against the inner surface of the cylinder. In the instance given I employ pressure sufficient to pack thirty-five pounds of the fibers into the space of one cubic foot and maintain the pressure long enough to give the fibers under compression a "set" or deadened compaction—say about five minutes. This operation I will call the "pressure treatment." The pressure is then removed from the fibers and the compressed fibers removed from the cylinder preparatory to giving them another pressure, which I will call "reverse pressure." The mass of compressed fibers is then divided into lumps or sections and the lumps or sections put into the cylinder, but in a position therein the opposite to that they occupied during the pressure treatment—that is to say, that the parts of the mass of fibers that had a horizontal position during the pressure treatment are now therein in a perpendicular position to receive reverse pressure. The fibers are then subjected to strong pressure to the same extent as in the pressure treatment. The mass of compressed fibers is then removed from the cylinder, and is bound somewhat loosely with strong cord or wire, so as to allow a little space for the fibers to relax and expand from their compaction while undergoing the boiling operation which is to follow; or, instead of being so bound, I put it into a cage made of wire-cloth having meshes about one-eighth of an inch in size, the cage being made in two parts hinged to each other at the back and fastened in front, when closed, by hooks and eyes, its interior being of a shape suited to the shape of the compressed mass of fibers, and of an interior size a little larger than the size of the compressed mass of fibers. The object and effect of this relaxing and expanding space is to allow room for the indentations and any sharp angles imparted to the fibers by the pressure to swell and round out by the action of the boiling water upon them, and thereby remove or reduce feltive effects and promote resiliency in the curled fibers. I then submerge the compressed mass of fibers, while so bound or so caged, in boiling water, and keep it submerged under boil for about twenty minutes. The object and effect of this boiling operation is to confirm or make more permanent the curls imparted by the pressures after they have been so relaxed and expanded. The mass of treated fibers is then removed from the boiling water and put into cold water for a few minutes, so as to arrest at this stage the action of heat upon the animal fibers. It is then removed from the water and set aside in its bound condition for a couple of hours, then released from its binding and its compaction relaxed by pressure put upon its sides; then the fibers are partially opened out by hand and dried. When thoroughly dry, they are finally opened out by hand or other suitable means, and it will be found that the formerly straight fibers are now of a curly, bent, or twisted form, and are better adapted for upholstering uses.

I have given one example of my process, though I make such modifications of treatment as are found requisite or desirable in view of the nature, quality, and length of the fiber under treatment and the degree of curl desired to be imparted to it. For example, hog-hair is a short, straight, refractory fiber, and I have advantageously put sufficient of the pressure treatment and reverse pressure on it to compress seventy pounds of it into the space of one cubic foot. Then, again, cocoanut fiber and istle of, say, ten inches in length will require a less amount of the pressures than that quoted for hog-hair. Forty pounds, or even less, of the cocoanut fiber or of the istle compressed into the space of one cubic foot will yield a good curl result.

I have found that the curl in hog-hair and in horse-hair can be sufficiently confirmed by a boil of from fifteen to forty-five minutes, according to the character of the hair and the degree of curl imparted. One hour's boil generally suffices for istle or cocoanut fiber, but their term of boil may be extended into several hours, if desired, without injury to the fibers. The greater the amount of pressure employed the greater the degree of curl imparted to the fibers, and the shorter the fiber the greater the degree of curl desired. A less amount of pressure treatment will be given to istle or horse-hair twelve inches long than to istle or horse-hair six inches long, and a greater amount of pressure treatment will be given to a short rigid hog-hair than to a long elastic hog-hair. It will be seen, therefore, that the amount of pressure treatment to be put upon the fibers must be determined by the operator according to the length, stiffness, quality, and nature of the fiber under treatment and the amount of curl desired to be imparted thereto. In some cases the reverse pressure may be dispensed with—as, for example, where it is desired to impart but a moderate degree of curl to the fiber under treatment, as in the case of mixed cocoanut fiber, which is uneven and very rough, and in the case of long, soft, and elastic horsehair.

Most of the fibers sold in the market for upholstering uses are benefited by being dyed. This is especially true of the vegetable fibers. The dye contributes to resiliency, and the color enhances the commercial value of the vegetable fibers.

The fibers to be treated by my process may be dyed either before or after the process. If before, they should be dyed in strong dye-liquor, and, if the fiber is animal, at a low temperature, and the dye-liquor should be free of caustic, whether acid or alkali. If the fiber is vegetable, the temperature is immaterial; but the dye-liquor should be free of acid. In either case there should be added to the boiling water in which the curl is to be confirmed or made more permanent enough of the dye-liquor to prevent the water from extracting the dye from the fibers during the boiling operation. If the fibers are to be dyed after the process, strong dye-liquor and low temperature should be employed for both animal and vegetable fibers.

I do not limit this invention to the fibers named herein. I have tested it on other fibers and found beneficial upholstering results therefrom, among which I mention sisal and manila.

Having thus described my invention, what I claim as new, and desire to secure by Letters Patent, is—

1. The process of treating animal and vegetable fibers for upholstering uses, which consists in first intermingling the fibers, then squeezing them into bunches and placing the bunches in a strong cylindrical vessel and packing them down tightly therein, then subjecting the fibers to strong pressure and maintaining it awhile, then removing the mass of compressed fibers from the cylinder and loosely confining it in its compacted state by cord or wire-cloth cage, then boiling it in water, then putting it in cold water, then setting it aside in its bound condition, then releasing it from its confinement and putting pressure upon its sides, then partially opening out the fibers and drying them, and finally opening them out fully, substantially as hereinbefore described.

2. The process of treating animal and vegetable fibers for upholstering uses, which consists in first intermingling the fibers, then squeezing them into bunches and placing the bunches in a strong cylindrical vessel and packing them down tightly therein, then subjecting the fibers to strong pressure and maintaining it awhile, then removing the mass of compressed fibers from the cylinders and separating it into lumps or sections and putting the lumps or sections in the cylinder in reverse position therein, then again subjecting the fibers to strong pressure and maintaining it awhile, then removing the mass of compressed fibers from the cylinder and loosely confining it in its compacted state by cord or wire-cloth cage, then boiling it in water, then putting it in cold water, then setting it aside in its bound condition, then releasing it from its confinement and putting pressure upon its sides, then partially opening out the fibers and drying them, and finally opening them out fully, substantially as hereinbefore described.

3. As a new article of manufacture, animal and vegetable fibers such as hereinbefore specified made suitable for upholstering uses by being curled by strong pressure, and the curl partially relaxed, and as relaxed confirmed by being boiled in water, substantially as hereinbefore described.

WESLEY W. HAMILTON.

Witnesses:
JAMES T. GRAHAM,
C. SEDGWICK.